May 14, 1968 R. G. MATHESON 3,382,790
MACHINE FOR PROCESSING PHOTOGRAPHIC FILM
Filed Dec. 3, 1964 8 Sheets-Sheet 1

Inventor:
Ralph G. Matheson,
by Arthur D. Thomson
Attorney

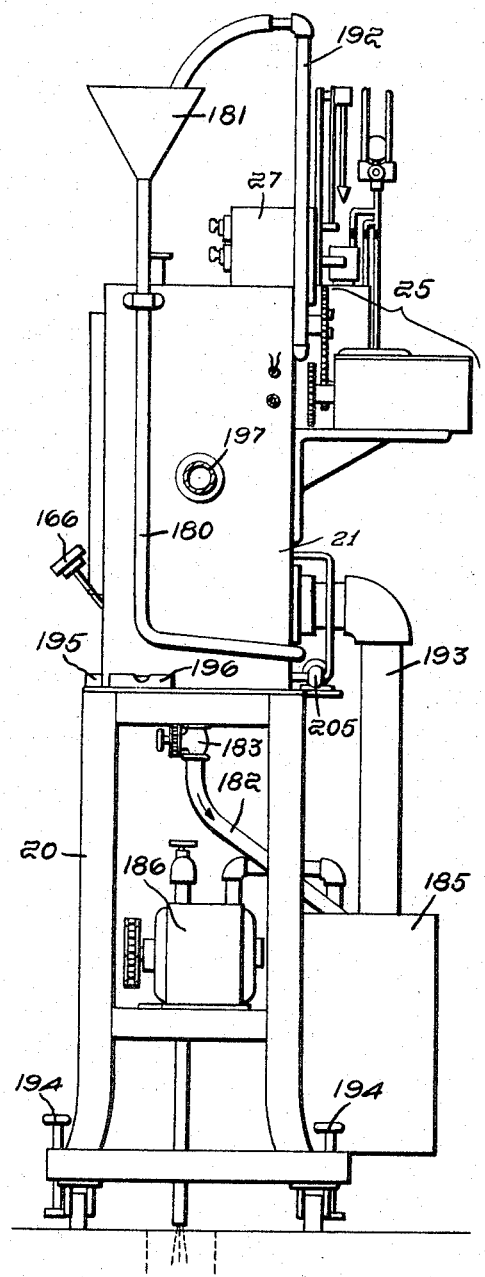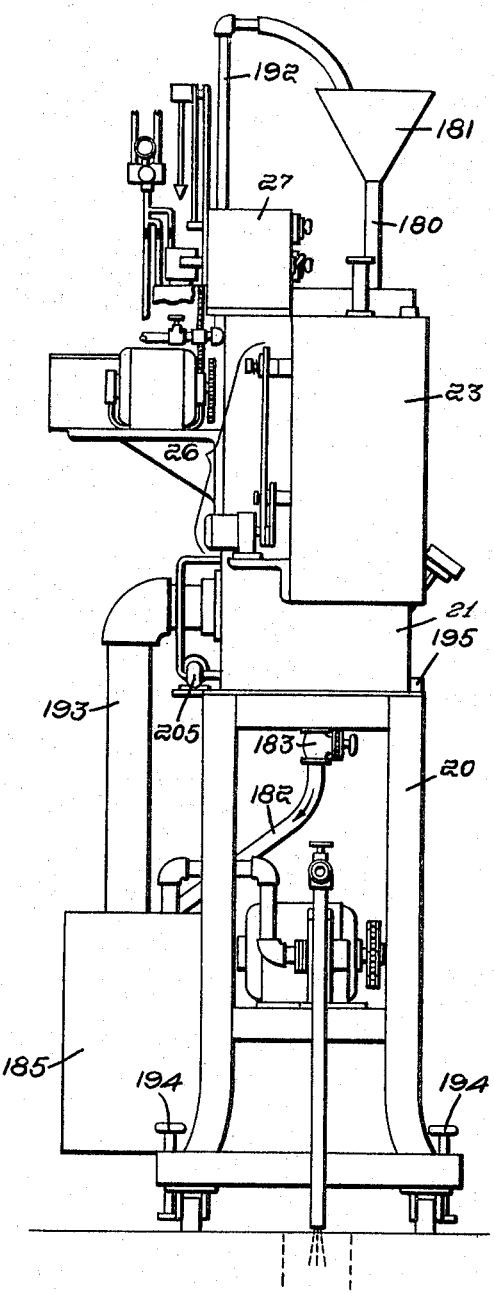

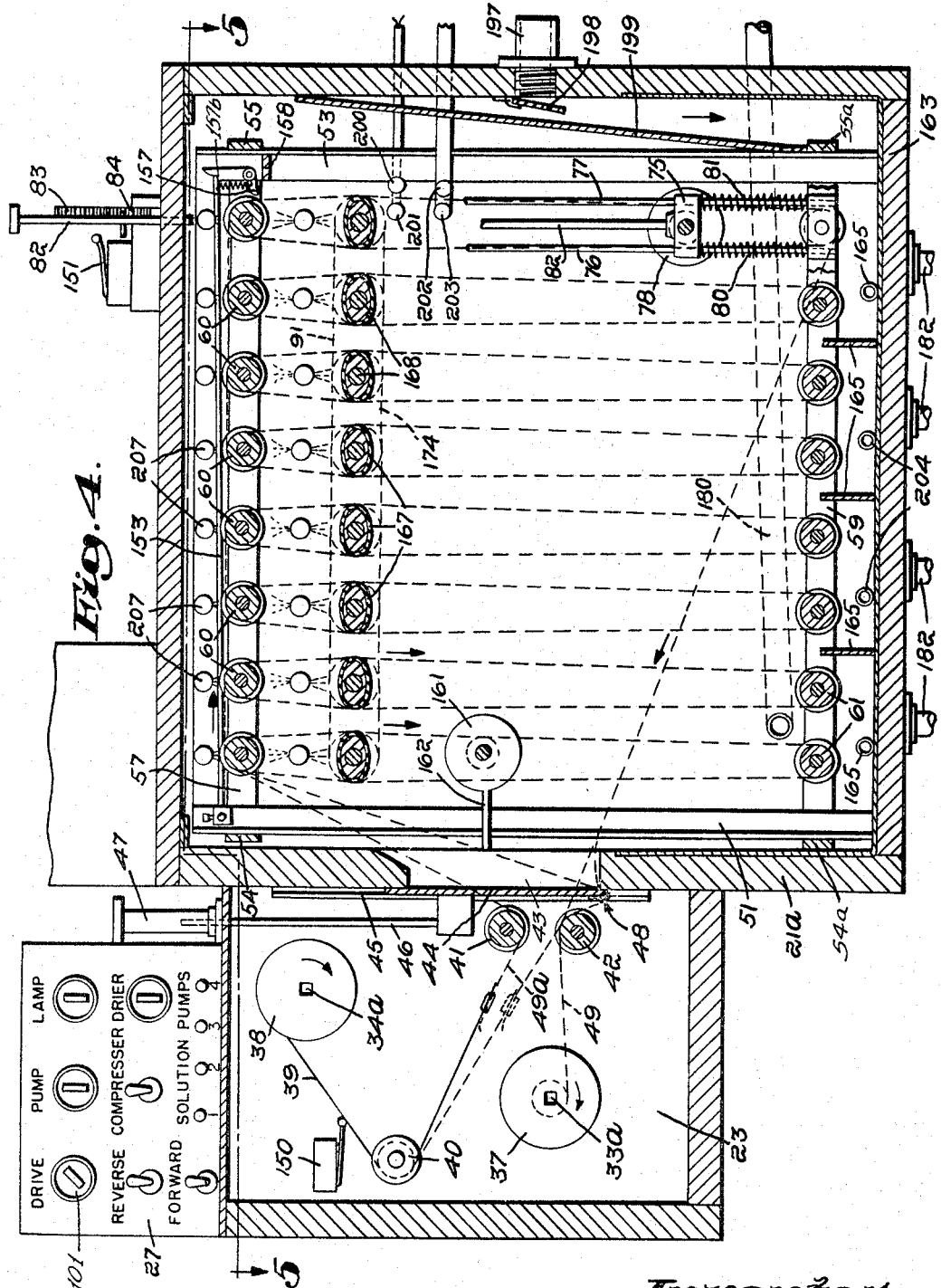

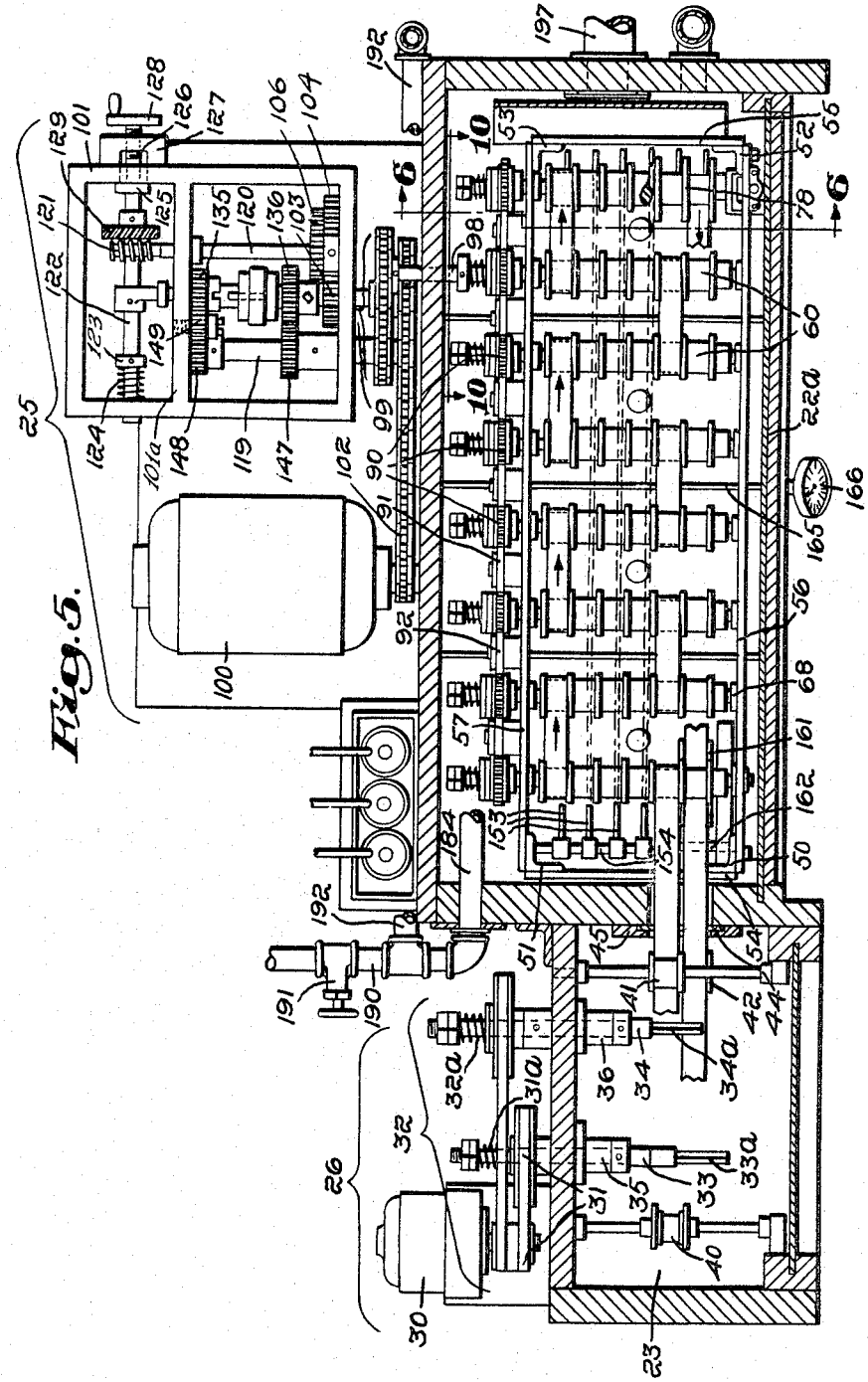

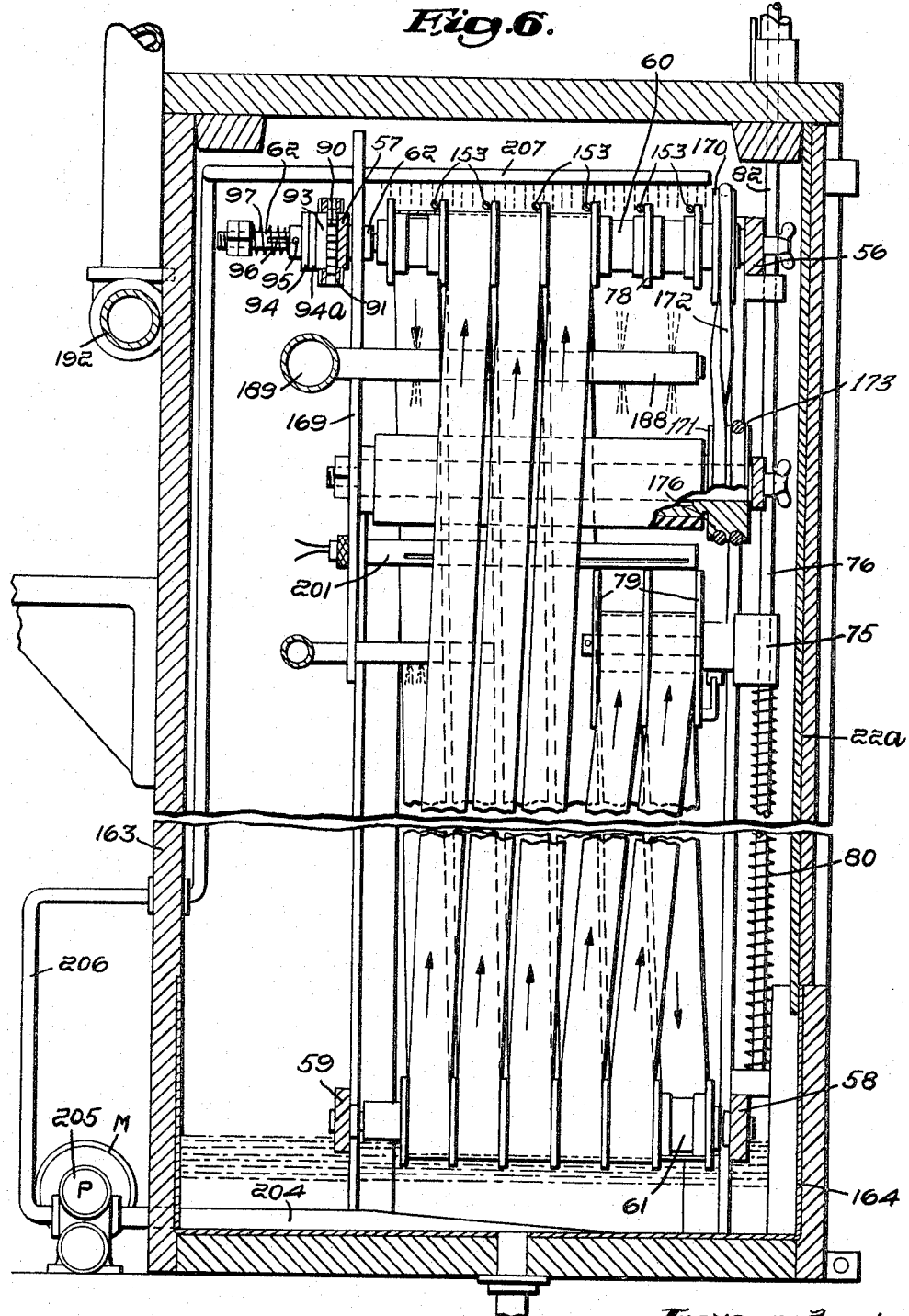

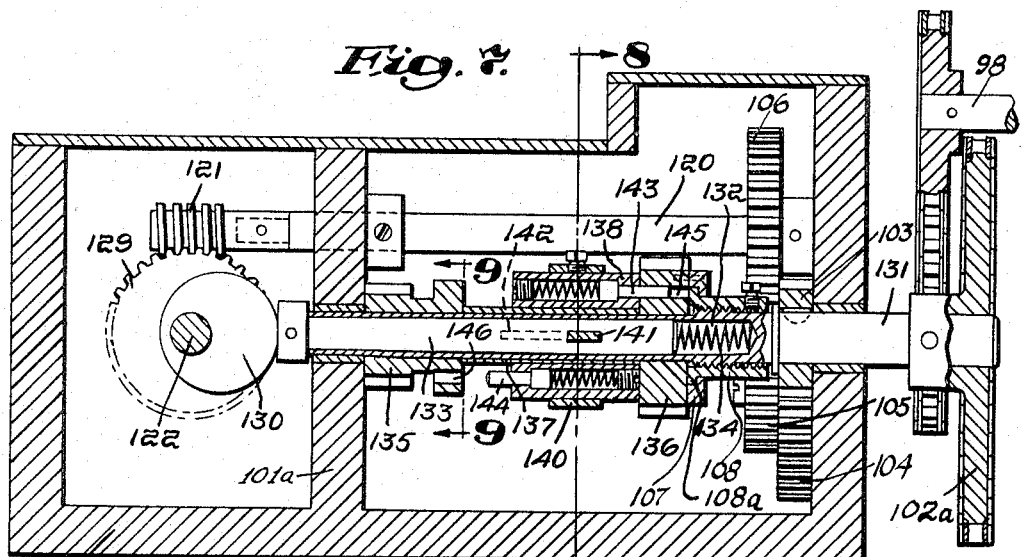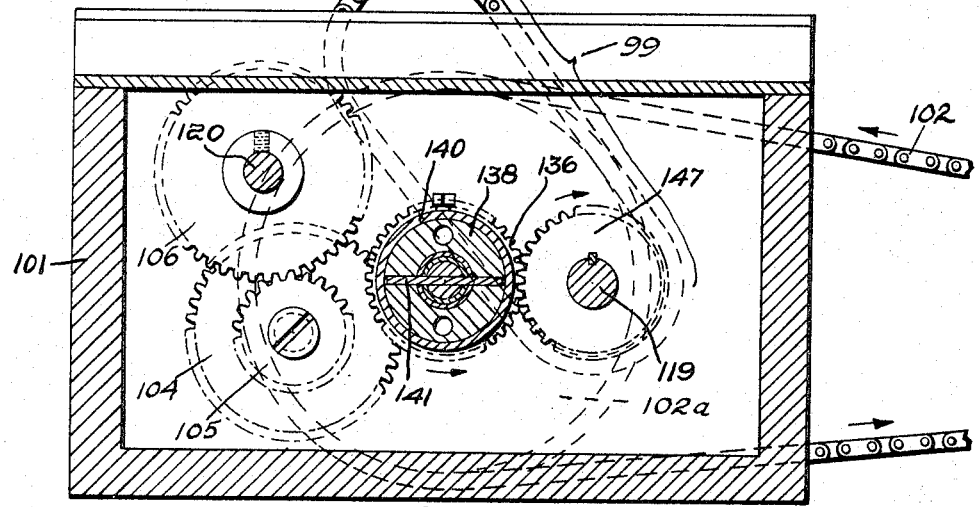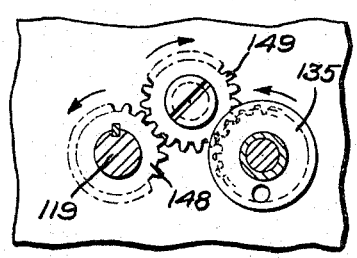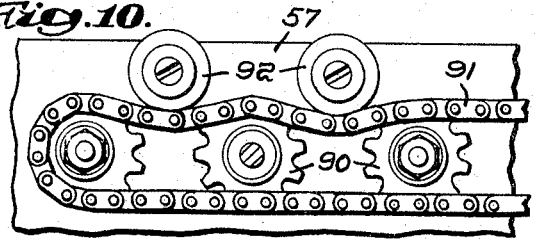

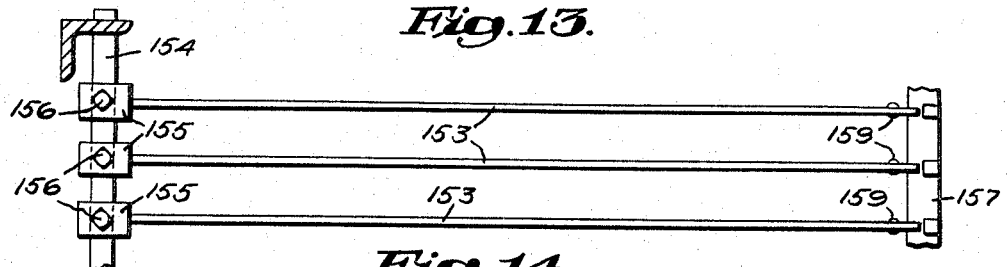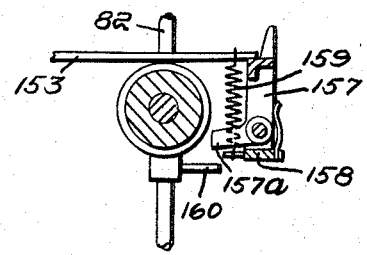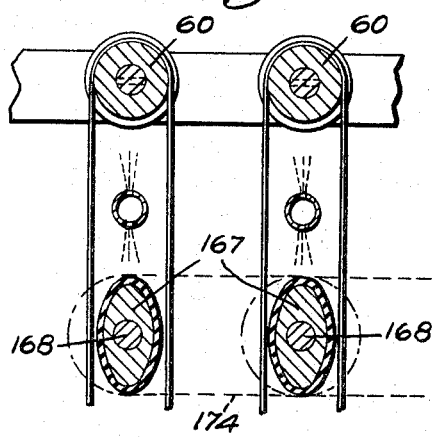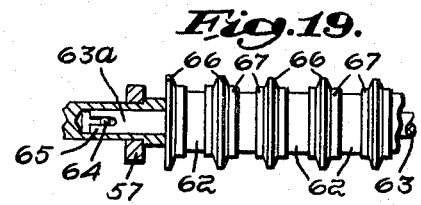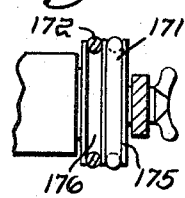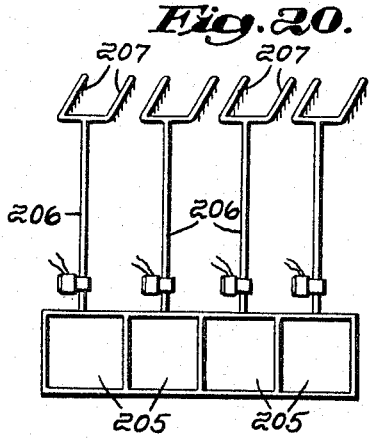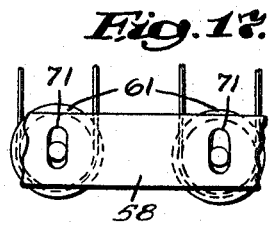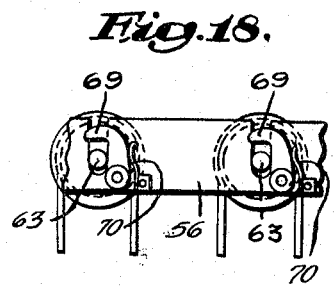

United States Patent Office 3,382,790
Patented May 14, 1968

3,382,790
MACHINE FOR PROCESSING PHOTOGRAPHIC
FILM
Ralph G. Matheson, 178 Essex St.,
Gloucester, Mass. 01930
Continuation-in-part of application Ser. No. 4,035,
Jan. 22, 1960. This application Dec. 3, 1964, Ser.
No. 417,534
4 Claims. (Cl. 95—94)

ABSTRACT OF THE DISCLOSURE

Film is processed by winding it spirally over a series of top and bottom rollers in an enclosed tank. The bottoms of the film loops pass through a shallow layer of processing solution in a series of partitioned compartments at the bottom of the tank. The film is advanced alternately in opposite directions in cycles corresponding to the length of film between the submerged loop portions. Supply and take-up reels are mounted outside a sliding door to the tank. A film tensioning roller is mounted in the tank. Air and fluid can be sprayed on the film loops. A leader is used for threading the film into the tank. The required processing and wash solutions are sequentially cycled into and drained out of the tank.

---

This invention relates to machines for developing photographic film and more particularly to a machine designed for processing relatively small batches of film. This application is a continuation-in-part of my previous application Ser. No. 4,035, filed Jan. 22, 1960, now abandoned.

The type of machine most commonly used for commercial film processin gis known as the continuous type. In a continuous machine, the film is run continuously over and under banks of upper and lower rollers submerged in a series of tanks which are filled with the various processing and washing baths. Each tank and its associated bank of rollers must be designed to such a size that the film remains in the particular solution the correct length of time for processing.

A continuous machine is large, bulky and expensive to build. For example, a machine designed for a typical black and white reversal process, requires, in the following order, a first developer tank, a wash tank, a bleach tank, a clearing-bath tank, a second developer tank, a wash tank, a fixing-bath tank, a final wash tank, and a drying compartment. A machine for processing color film requires an even greater number of tanks.

A continuous machine is expensive to operate. The tanks must be filled to operating capacity with solutions. Because of the physical size of the tanks the volume of solution required to maintain the operating level far exceeds the amount actually needed to perform the chemical reaction.

The machine must be filled with the many gallons of solution required to maintain the operating level, regardless of the footage of film being processed. For example, a typical machine designed to accommodate a thousand feet of film, may have a tank capacity of about thirty-six gallons (not including water baths). This much chemical solution must be put into the machine to process even a few feet of film.

Deterioration, and contamination due to "carry over" of solution from one tank to another, continually take place. To compensate for contamination, deterioration, and depletion, due to chemical reaction, fresh solution must be fed into, and a corresponding amount drained from, each tank. Some fresh solution is lost down the drain along with the old solution. The replenishment rate must be adjusted according to the speed of the machine, type of film, temperature, and other factors. If the machine stands idle for any length of time, many feet of test film must be run through the machine to bring the replenishment rates back into equilibrium, before processing can be resumed. During long idle periods, furthermore, the parts may become corroded to such an extent that the rollers "freeze" and have to be freed before the machine can be run.

A continuous machine is essentially a single-purpose machine. In order to convert a machine to perform a process requiring a different sequence and timing of processing steps, the entire series of tanks and roller banks would have to be changed. Even if the changeover involves merely a change in solutions, the difficulty of cleaning the tanks and rollers makes conversion impractical.

Because of all these problems, which are inherent in a machine designed to operate on the continuous principle, a continuous machine is suitable only for commercial establishments, which regularly process thousands of feet of the same type of film per day, so that the machine can be kept running at full capacity. For intermittent processing of small batches of film, especially film of different types, the cost of installation, operation, and operation of continuous machines would be prohibitive.

A common type of machine used for small batch developing, is that known as a rewind machine. This machine employs two reels immersed in a tank, and the film is wound back and forth from one reel to another. The tank may be emptied and filled for each processing step or the reel and drive mechanism may be moved from one tank to another. In a rewind machine, only a short length of the film is exposed to the solution at any one time. The remainder is wound on itself on the reels. The relatively poor access of fresh solution to the film makes it necessary to use long developing times. As a typical example, the recommended first developer bath time for Eastman Plus-X black and white reversal film is 20 minutes in a rewind machine as compared to 2 minutes in a continuous machine, a ratio of ten to one. From the standpoint of time alone, it would be impractical to use a rewind machine for the more complex processes, such as development of typical color film which requires twelve different processing steps and a total processing time of about an hour. Furthermore, the continual winding and rewinding of the film on itself while the emulsion is soft is likely to cause physical damage to the film.

Although a rewind machine is more economical for batch development than a continuous machine, the rewind machine uses more solution than necessary for the chemical reaction, because the tank or tanks must be full enough to keep the reels submerged, regardless of the amount of film on the reels.

The principal object of this invention is to provide a machine which will process small as well as large batches of film quickly and economically, which can be used without alteration for developing any type of still and motion picture film and photographic paper, including color film, which can be readily adapted for processing films of various widths, and which will consistently produce high quality development even in the hand of a relatively unskilled operater. Another object is to produce a machine which utilizes only a minimum of solution, preferably very close to the amount actually required for the chemical reaction, so that fresh solution may be used for each operation, and which may be easily cleaned, thus eliminating contamination and corrosion. Another object is to produce a machine which is compact, inexpensive, and readily portable. Still another object is to provide a machine which may be readily adapted for manual, semi-automatic, or fully automatic operation.

Another object is to provide a method of processing film which requires a minimum of solution, which eliminates the undesirable directional effects sometimes occurring when film is developed in a continuous machine, and which insures high quality development of all types of film. Other objects, advantages, and novel features of the machine will be apparent from the following description.

The machine has a single processing tank in which all the developing steps are performed. Mounted in the tank is a film holding rack with upper and lower banks of rollers around which the film is passed. Certain of the rollers are driven by means of a special drive device which can be set to reciprocate the film during the developing operations, or to run the film in forward or reverse direction for loading and unloading or other operations where unidirectional motion may be desired. A loading chamber is disposed alongside the tank and communicates with the tank through an opening which may be closed by a gate. Inlet pipes for supplying various solutions to the tank are provided, and the tank is also provided with a spray system, for washing, and a hot air system for drying. The film to be developed is run on to the rack by means of a leader and the ends of the film are then spliced together and dropped into the tank. Spring-pressed rollers take up the slack. The processing solutions are fed into the tank in proper sequence, either manually or automatically, and the tank is drained and the film washed by means of the water spray system between each operation. The tank is ordinarily filled with solution only up to about the middle of the lower rollers, and the reciprocating motion of the rack drive carries all of the film into contact with the solution, so that a relatively small amount of solution is sufficient for operation of the machine.

The method of developing film here described consists essentially of supporting a strip of film in vertically disposed loops in such a manner that no part of the film touches any other part, submerging only the lower portions of the loops in a bath of processing solution, and causing the film to travel so that all its parts are successively drawn through the solution, first in one direction, then in the other. An optional additional step in the new method is to direct a stream of solution on to the upper parts of the loops while drawing the film through the bath.

In the drawings illustrating the invention:

FIG. 2 is an end elevation of the right-hand end of the machine of FIG. 1;

FIG. 3 is an end elevation of the left-hand end of the machine of FIG. 1;

FIG. 4 is an enlarged vertical cross-section of the tank and loading chamber portion of the machine;

FIG. 5 is a cross-section taken along line 5—5 of FIG. 4.

FIG. 6 is an enlarged fragmentary cross-section taken along line 6—6 of FIG. 5;

FIG. 7 is an enlarged fragmentary cross-section of the reciprocating drive mechanism for the machine;

FIG. 8 is a cross-section taken along line 8—8 or FIG. 7;

FIG. 8 is a cross-section taken along line 8—8 of FIG. 7;

FIG. 9 is a fragmentary cross-section taken along line 9—9 of FIG. 7;

FIG. 10 is a fragmentary cross-section taken along line 10—10 of FIG. 5;

FIG. 13 is a fragmentary plan view of a device for holding the film in case of breakage;

FIG. 14 is a fragmentary sectional view of a latch and release mechanism of the device of FIG. 13;

FIG. 15 is a fragmentary sectional view taken in the region of one of the top rollers and spray pipes;

FIG. 16 is a fragmentary side view of a drive arrangement for the buffer rollers;

FIG. 17 is a fragmentary end view of the bottom roller assembly illustrating the mounting of the rollers;

FIG. 18 is a fragmentary end view of one of the top rollers illustrating the front mounting;

FIG. 19 is a fragmentary plan view of the rear end of one of the top roller assemblies; and FIG. 20 is a schematic view of the pumping arrangement for recirculating solution in the tank.

Figure 1:
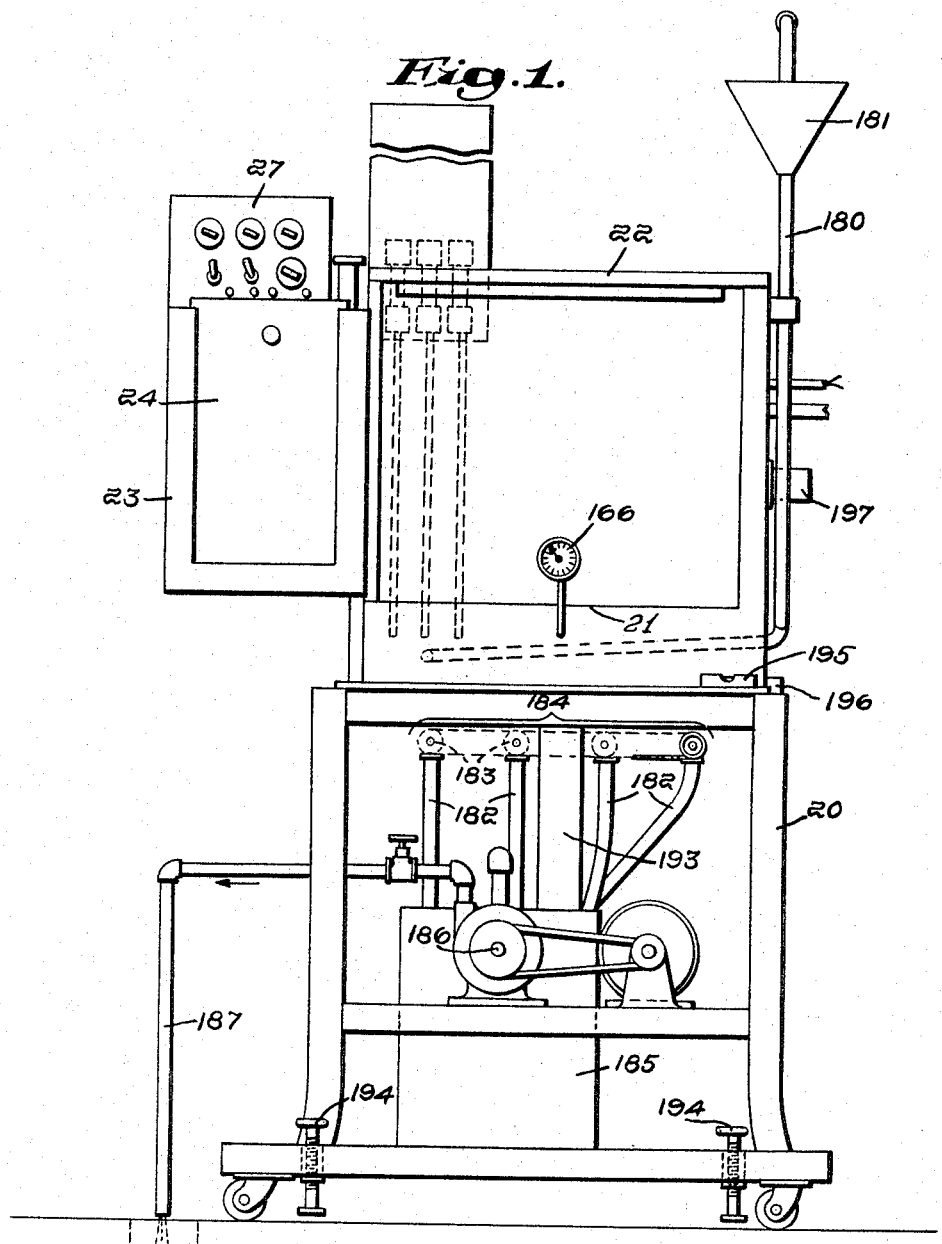
FIG. 1 is a side elevation of a machine constructed according to the invention.

As shown in FIGS. 1, 2 and 3, the various parts of the machine are mounted on a portable frame or cart 20. A developing tank 21, having a removable cover 22 is mounted on the top of the cart. The loading chamber 23, having a sliding front cover 24, is mounted on one side of the tank, and the drive mechanism, generally indicated by the numeral 25, for driving the film holder is mounted on the rear of the tank.

A film tensioning mechanism, generally indicated by the numeral 26, is mounted on the rear of the loading chamber, and a control panel 27, on which the switches for controlling the film drive and other devices associated with the machine are mounted, is disposed above the loading chamber.

The film tensioning device 26, shown in detail in FIG. 5, consists of an electric motor 30, connected by belt and pulley drives 31 and 32 to shafts 33 and 34 mounted in bearings 35 and 36, respectively, on the back wall of the loading chamber. The shafts have squared ends 33a and 34a on which conventional film reels may be mounted. The motor, when running, drives both shafts clockwise through the belt drives and spring-pressed friction clutches 31a and 32a. A take-up reel 37 is placed on shaft 33, and the reel 38 holding the film 39 which is to be developed is placed on shaft 34. The film to be run into the machine is passed around a guide roll 40 rotatably mounted in the loading chamber. A pair of guide rolls 41 and 42 are mounted in the loading chamber adjacent the end wall 21a of the developing tank. This wall has an opening 43 through which the film is fed in and out of the developing tank. A gate 44 is mounted on slides 45 on this wall, and can be moved up and down by means of a rod 46 projecting through the top of the loading chamber and attached to a handle 47. The gate has a felt pad 48 at the bottom. When the machine is idle, a leader 49, which is threaded through the film holding mechanism to be later described, has one of its ends passing over roller 42 and started around the take-up reel. The other end 49a is free. The gate 44, when closed, holds end 49a for splicing to one end of film 39, and is also closed after the film has been run into the machine, to hold the free ends of the film so that they can be spliced together and exclude light from the developing tank.

The film holder, which is mounted in the developing tank, has a rectangular frame consisting of four upright posts 50, 51, 52, and 53, secured together by pairs of end bars 54, 54a and 55, 55a supporting a pair of upper bearing bars 56 and 57 and a pair of lower bearing bars 58 and 59. The upper bearing bars carry a number of top roller assemblies, generally indicated by the numeral 60, and the lower bearing bars carry a number of bottom roller assemblies, generally indicated by the numeral 61.

The top roller assemblies and their mountings are all of similar construction. As illustrated in FIG. 19, each assembly consists of a sleeve 62, molded or otherwise formed from a chemical resistant plastic or other suitable material, and pressed on to a shaft 63. The rear end 63a of the shaft is slotted to engage a pin 64 carried by a tubular collar 65 which is rotatably received in bearing bar 57. Sleeve 62 has a number of flanges 66, preferably slightly bevelled toward the outside, which are spaced apart by a suitable distance to receive between them a piece of the film. At the base of the flanges are ribs 67 which are of suitable width to engage the edges only of the film so that the central part of the film is held out of contact with the body of the sleeve. The sleeve 62 also carries front shoulders 68 (FIG. 5) which bear against bar 56. This bar may be made removable from posts 50 and 52, in which case the bar is provided with holes in which the front ends of shafts 63 are disposed. An alternate manner of mounting the front ends of the shafts is illustrated in FIG. 18. The bar 56 is slotted from the top down to receive the shafts, and a latch 69, under pressure of a leaf spring 70, engages the top of the shaft. In either case the top roller assemblies may be removed by releasing their front ends and withdrawing their rear ends from sleeves 62.

The bottom roller assemblies 61 are similar to the top roller assemblies. The ends of their shafts, however, are received in vertically elongated holes 71 in bar 58, as shown in FIG. 17, and in similar elongated holes in bar 59. Bar 58 may be removable, or may have slots and latches similar to those shown in FIG. 18, so that the lower roller assemblies can also be removed.

Mounted near the front of the machine at the end furthest from the loading chamber is an elevator assembly consisting of a bracket 75 slidable up and down on rods 76 and 77 attached to bars 57 and 59, and a roll assembly 78 rotatably mounted on the bracket and having flanges 79 forming film-receiving sections. Bracket 75 is urged upward by coil springs 80 and 81 mounted on rods 76 and 77. A rod 82 is mounted on bracket 75 and extends out through the top of the developing tank. A scale 83 is mounted on top of the tank and rod 82 carries an indicator 84 which shows the position of the elevator assembly.

The upper roller assemblies are driven with a rotary motion by the drive mechanism generally indicated by the numeral 25 in FIG. 2, through a number of sprockets 90 (FIG. 5), one to each roller assembly engaged by a chain 91. As shown in more detail in FIG. 10, the chain is kept taut by means of idler rolls 92 mounted on bar 57 between the sprockets. The mounting and engagement of the sprockets with the roller assemblies is best seen in FIG. 6. The sprocket 90 runs freely on the sleeve 62 to which the end of the roller assembly shaft is connected, as previously described. The sprocket carries a clutch face 93. The rear end of sleeve 62 carries a clutch member 94 which is axially slidable along the sleeve and is secured by a pin 95 riding in a slot 96 in the sleeve. The clutch member is urged toward the sprocket by a spring 97 secured to sleeve 62, and has a clutch face 94a of suitable material, such as leather, which frictionally engages clutch face 93. Normally, rotation of the sprocket will rotate the roller assembly, but the friction clutch provides slippage between the sprocket and roller assembly in case the film becomes jammed for any reason. One of the sprockets, for example, the second from the right-hand end in FIG. 5, has an extension 98 of its shaft 62, out through the rear wall of the tank, and is connected by a sprocket and chain drive 99 to the output shaft 119 of the drive mechanism.

The drive mechanism 25 is illustrated in detail in FIGS. 5, 7, 8 and 9. An electric motor 100 provides power for the drive and is controlled by a switch 101 (FIG. 4) on the control panel 27. The mechanism for producing reciprocating motion is housed in a gear box 101. A chain 102 from a sprocket on the motor drive shaft, drives a sprocket 102a which is mounted on the input shaft 131 of the reciprocating drive mechanism. A gear 103 is mounted on shaft 131 inside the gear box and engages a gear 104, also mounted inside the gear box. Gear 104 is concentrically attached to a gear 105 which, in turn, engages a gear 106 mounted on a shaft 120.

Shaft 120, which is continuously driven in one direction while the motor is running by the gearing just described, carries a worm 121. A shaft 122 is mounted at right angles to shaft 120 in the rear of the gear box. Shaft 122 carries a collar 123 which is engaged by a coil spring 124, bearing on the wall of the gear box, which urges the shaft toward the right, as viewed in FIG. 5. The right end of the shaft is mounted in a bearing 125 on the right-hand wall of the gear box by a screw 126 threaded into a bracket 127 and attached to a handle 128. A worm gear 129 is mounted on shaft 122. By turning handle 128 to advance or retract the screw, gear 129 can be brought into or out of engagement with worm 121.

An eccentric cam 130 is mounted on shaft 122 and is revolved whenever gear 129 is engaged with worm 121 and shaft 120 is rotating. The shaft 131, which constitutes the input shaft of the drive mechanism is rotatably supported by the front wall of the gear box 101 and a partition 101a in the gear box. This shaft has an axial recess 132 in which a cam follower 133, in the form of a headed stud, is slidably received. A spring 134 bears on the inner end of the follower and holds the head of the follower in engagement with cam 130. A pair of floating gears 135 and 136 are freely mounted on shaft 131 and are held apart by a spacing sleeve 137. A collar 138 is slidably mounted on sleeve 137. A cross-bar 141 extends through collar and follower 133 to tie the two together, and passes through elongated axial slots in sleeve 137 and shaft 131, indicated by the dotted outline 142 in FIG. 7. The cross bar is retained by a ring 140 on the outside of collar 138. The follower and collar are thus tied together and are axially slidable together along shaft 131.

A spring-pressed pin 143 is mounted in collar 138 to project to the right (as viewed in FIG. 7), and a similar spring-pressed pin 144 is mounted to project to the left. Gear 136 has a hole 145 for receiving pin 143, and gear 135 has a hole 146 for receiving pin 144. The collar 138 is shown in its extreme right-hand position in FIG. 7 with pin 143 engaged in hole 145. The collar in this position is locked to gear 136 and drives that gear. It is apparent that, as cam 130 turns through the next half revolution, follower 133 and collar 138 will move to the left, until pin 144 engages in hole 146 in gear 135 to drive that gear. On the next half revolution of the cam, the collar will move to the right again.

Shaft 119 carries a pair of gears 147 and 148. Gear 147 meshes with gear 136, and gear 148 meshes with an idler gear 149 which is driven by gear 135. Gears 135 and 136 thus drive shaft 119 in opposite directions. As the collar 138 is locked alternately to gears 135 and 136, while cam 130 is rotating, this motion is transmitted to shaft extension 98 and thus to the entire set of upper rollers.

The various gear ratios of the reciprocating drive mechanism are so designed that a length of film corresponding to at least one of the loops passing around one of the upper and lower roll sections, or a greater length, if desired, will be drawn through the solution in the bottom of the tank, first in one direction, then in the other, during each reciprocating cycle. During a certain period when collar 138 is moving between the floating gears 135 and 136, and both gears are disengaged, there is a dwell in the motion of the film. During this time, portions of the film around the lower rollers remain immersed in the solution. In order to avoid having the same parts of the film thus immersed during every dwell in the cycle, the drive mechanism may be adjusted so that the film travels somewhat further in one direction than the other, thus bringing different parts of the film around the bottom rollers at each dwell in the motion. As will be seen in FIG. 7, gear 136 is attached to a collar 107, which engages the flange 108a of a sleeve 108. This sleeve is threaded on to shaft 131, so that the position of gear 136 can be axially adjusted along the shaft. The travel of collar 138 is limited by the slots in which cross bar 141 rides. Therefore, by moving gear 136 further away from gear 135, the period of engagement between collar 138 and gear 136 can be made shorter. Thus, the output shaft can be made to revolve a fewer number of turns when driven by gear 136 than when driven by gear 135. Consequently, the entire strip of film in the machine will be moved somewhat further in one direction than in the other so that different portions of the film are exposed to the solution during each dwell in the cycle, and the possibility of uneven development is eliminated.

The motor 100 is controlled by three separate energizing circuits (not shown). One circuit is controlled by the switch marked "Drive" on panel 27 (FIG. 4). This switch is turned on when the film is to be driven with reciprocating motion. To drive the film continuously in the forward or reverse direction, for winding or rewinding or other operations, the handle 128 is turned to disengage gear 129 from worm 121, leaving shaft 122 free. Spring 134 will push cam follower 133, turning cam 130, so as to carry collar 138 into engagement with gear 135. Shaft 119 will then be driven continuously in one direction by this gear. The two other energizing circuits for motor 100 are controlled by the switches marked "Forward" and "Reverse," respectively, on panel 27, and drive the motor in opposite directions.

The leader 49 is threaded, initially by hand, onto the second from the front film holding section of the left-hand upper roller, as seen in FIG. 4, then around successive sections of the corresponding lower roll and upper roll in a series of loops. At the rear of the first upper roll the leader is carried to the next upper and lower pair around which it is wound in loops. This process is continued in the pattern shown in FIGS. 4, 5 and 6, until the last set of rolls is reached. The two front loops in the last series are wound around the lower roll and the elevator roll 78, and the leader then passes from this lower roll back to the take-up reel 37, as indicated in dotted lines in FIG. 4. To feed the film into the machine the end of the film is stapled, with the emulsion side down, to the free end 49a of the leader, and the motor 100 is run to drive the film in the forward direction. A snap switch 150, mounted in the loading chamber, bears on, and is held closed, by the film 39 during this operation. This switch is included in the "Forward" and "Reverse" circuits of the motor 100. The tensioning device 25 drives reels 37 and 38 in the clockwise direction as viewed in FIG. 4, thus maintaining tension on the film through drag on the friction coupling on reel 38 and winding the film up on reel 37. When the inner end of the film drops off reel 38, switch 150 opens, stopping motor 100.

Another stop device for motor 100 is provided in case of film breaking during operation of the machine. A snap switch 151, wired into all three control circuits of the motor is mounted on the top of the developing tank near rod 82. This switch is of the normally closed type. When the film (or leader) is under the correct tension, elevator rolls 78 are drawn down against the pressure of springs 80 and 81. If the film breaks, either during winding or rewinding, or during a reciprocating cycle, the elevator assembly, including rod 82, will move upward, and arm 84 will engage and open switch 151, thus stopping the motor 100.

A film clamping device is also brought into action upon upward movement of the elevator assembly. As shown in FIGS. 4, 5 and 13, a number of rods 153 are mounted on a cross rod 154 in the upper part of the machine. Rods 153 are spaced so that each will engage one edge of a section of film on each of the upper rollers. The rods 153 are secured to rod 154 by slidable blocks 155 and set screws 156 so that their spacing and number can be varied according to the width of the film. Rods 153 are ordinarily held up out of contact with the film by a latch bar 157 (FIGS. 4 and 14) rotatably mounted on a fixed bar 158 at the right-hand end of the film holder rack. Rods 153 are urged downward by springs 159 tied to bar 158. The ends of rods 153 ordinarily rest on a shoulder 157b of bar 157. Latch bar 157 has a projecting tongue 157a adjacent rod 82, and this tongue is engaged by an arm 160 on rod 82 when the elevator assembly springs upward, thus tripping the latch and allowing rods 153 to drop down. The film is thus held firmly on the rollers of the track in the event of film breakage. The rods 153 are designed to engage only the edge of the film in which the sprocket holes are located so that no damage is done to the picture portion.

After the film has been run into the machine, its free ends are spliced together and dropped into the tank. A roller 161 mounted near the front of the machine receives the joined portion, and a pair of guide rods 162 projecting toward opening 43 guide the film onto this roller. The elevator assembly rises somewhat to take up the slack, but not enough to operate the stop switch 151 or the latch 157.

The tank 22 preferably has a layer of insulation 163 in all its walls, and the removable front panel 22a is also similarly insulated. The lower portion of the tank preferably has a liner 164, of stainless steel or similar material. A series of baffles 165 run across the bottom of the tank and extend upward to the level of the center of the lower roller assemblies. A thermometer 166, of any type, is installed on the tank to indicate its interior temperature.

The film holder preferably has a series of buffing rolls 167. One of these rolls is mounted below each of the upper roller assemblies. The buffer rolls are elliptical in shape and are faced with rubber or other resilient material, and are mounted on shafts 168 supported on a bracket 169. A pulley 170 is secured to one of the upper roller assemblies, as illustrated in FIG. 6, and is connected to a similar pulley 171 on the buffer roll shaft immediately below by a crossed belt 172. A second pulley 173 on the buffer roll shaft engages a second belt 174, indicated in dotted outline in FIG. 4, which passes around similar pulleys (not shown) on each of the other buffer roll shafts. One buffer roll is thus driven from an upper roller assembly, and the remaining buffer rolls receive their drive from the driven roll. An alternate method of transmitting motion from one buffer roll to the next, as shown in FIG. 16, is to provide each buffer roll with a double pulley 175, and use a series of short belts 176 each extending from one roll to the next.

Because the main drive belt 172 is crossed, the buffer rolls are driven in a direction opposite to that of the upper rollers, and therefore opposite to the direction of motion of the film. The purpose of the buffer rolls is to assist in removing the back coating from film which is coated on the back with a light absorbent black coating, as is the practice for certain types of film. To put the buffer rolls out of action for other operations, belt 172 is disconnected, and all the buffer rolls are turned to the vertical position, as shown in FIG. 15, so that they are out of contact with the film.

To insert the various processing solutions, the machine is provided with a filler pipe 180 which discharges into the lower part of the tank between the left wall and the left baffle 165, as viewed in FIG. 4. This pipe leads upward to a funnel 181. The tank is drained by means of four drain pipes 182 controlled by four hand valves 183 (FIG. 1), linked together by a chain and sprocket drive 184 so that all the valves may be opened simultaneously by turning any one. The drain pipes 182 discharge into a tank 185, from which the drained liquid is pumped by a pump 186 to an outlet pipe 187 which may lead to any convenient floor drain or other disposal area.

A number of spray tubes 188, having orifices adapted to direct spray both upward and downward, are disposed in the machine one belowe each of the upper roll assemblies. These tubes are connected to a common manifold 189 which leads to a water inlet pipe 190 (FIG. 5) connected to any suitable water supply. Preferably the wash water is supplied from a source of hot and cold water through a thermostatic mixing valve, 191, of conventional type, which regulates the temperature of the incoming water. A by-pass line 192 is connected to inlet pipe 190 and leads to funnel 181 so that the funnel 181 and feed pipe 180 are rinsed whenever the water is turned on. An auxiliary drain 193 connected to tank 23 above the normal level of solution is provided for accommodating overflow of water during the washing cycle.

To facilitate in levelling the machine for stationary operation the cart 20 is provided with screw posts 194 which can be let down to lift the wheels, and levels 195 and 196 in two directions to indicate when the tank 22 is in level position. Warm dry air, from any suitable source, is admitted to tank 22 through pipe 197 during the drying cycle. As shown in FIG. 4 the inlet for this pipe is covered by a flapper valve which is raised by pressure of incoming air. A baffle 199 directs the air downward and sets up circulation within the tank.

Figure 11:
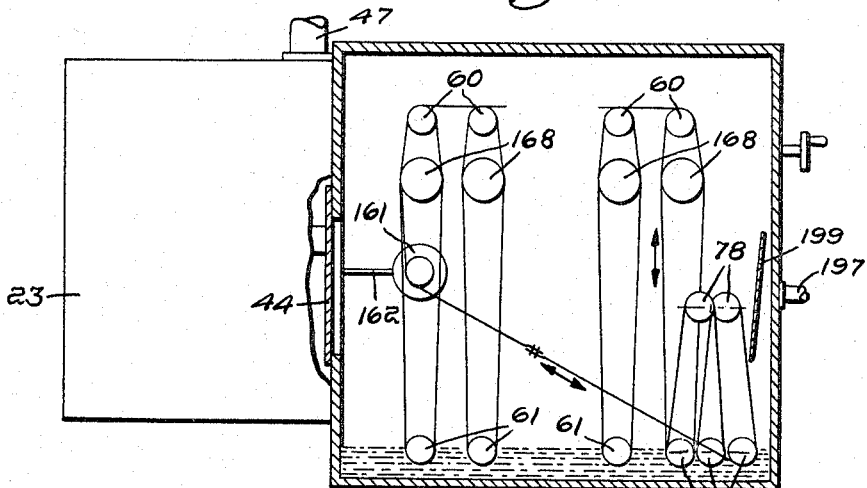
FIG. 11 is a schematic side view of the tank and loading chamber showing the film in process of development in the machine.
Figure 12:
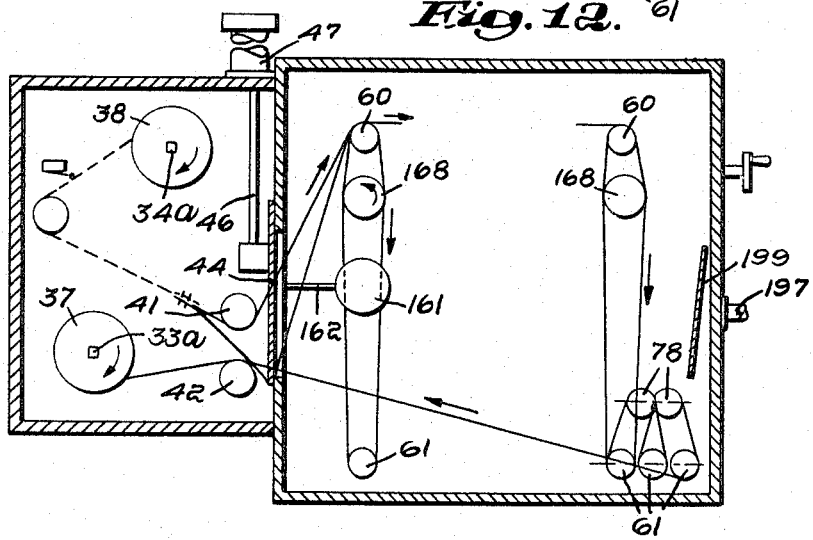
FIG. 12 is a schematic side view of the tank and loading chamber showing the developed film being rewound.

The devices so far described constitute the basic parts of a machine for developing any of the common types of films. To perform a typical developing process the machine is operated as follows:

The reel of films to be developed is placed on shaft 34 and the outer end of the film 39 is led around guide roll 40 and spliced to the free end 49a of the leader 49 which is normally kept threaded in the machine, between operations. The gate 44 is kept closed when the machine is not in use to prevent the end of the leader from falling into the tank. After the film is attached, the front panel 24 of the loading chamber is closed to exclude light, and gate 44 is raised. The tensioning device 26 is started and the motor 100 is run in the "Forward" direction to run the film into the machine. After the film has been run in, as indicated by the opening of switch 150 which stops the drive motor, gate 44 is again closed. If the film is long enough to fill the machine to capacity, the two ends of the film will project from the tank and are held by gate 44. The end previously spliced to the leader is then freed and spliced to the other end. If the film is shorter, some leader remains in the tank. This leader is cut near roll 42 and spliced to the free end of the film. The spliced ends are freed, after closing panel 24, by opening gate 44, and are drawn into the machine. The elevator assembly, which has been pulled down by the tension on the film as it is run in, rises to take up the slack. The portion of the film which was pulled out for splicing is guided by a pair of rolls 162 onto roll 161. The film, or combination of film and leader, when in place for processing, forms a closed loop passing around the upper and lower roll banks, the elevator assembly, and roll 161, as indicated schematically in FIG. 11. As film is ordinarily wound with the emulsion side in, this side will be out of contact with the rollers when the film is run into the machine. Only the base side of the film is engaged by the rollers.

Preferably, the temperature of the interior of the tank is brought to the desired processing temperature before developments of the film. This can be readily done by adjusting valve 191 to the desired temperature and running wash water into the tank through the spray pipes, with the drains open, until the thermometer 166 registers the correct temperature. If the solutions are at this temperature when subsequently inserted, the insulation of the tank will maintain a substantially even temperature throughout the developing operation.

The first processing solution is poured into funnel 181 A quantity sufficient to fill the tank to the level of about the middle of the bottom rollers is sufficient. The drive mechanism is set for reciprocating motion. If the film has a back coating, the first solution is ordinarily the back coating remover, in which case the buffer rolls 167 are used. Each processing step is carried for the length of time recommended for the particular process. At the end of a processing step the operator opens the drains and turns on the wash water. The reciprocating motion may be continued during the washing cycle. The relatively large volume of water normally entering during a washing cycle causes the water level to rise and water overflows through pipe 193.

All the steps of the particular developing process, such as bleaching and fixing, are carried out in the proper sequence in much the same manner. The film being washed between each step. After the final wash, the drying air supply is turned on. The film may be reciprocated or driven in a direction reverse to the air flow during the drying operation.

After the developed film has been dried, the operator pulls the spliced joint out through opening 43, cuts the splice, and splices one end to a length of leader sufficient to refill the machine. The film is then rewound on a reel, simultaneously drawing a piece of leader back into the machine. As the film has been developed, panel 24 may be left open during rewinding so that the operator can see when the film has been completely withdrawn. Finally, the outer end of the film is detached from the leader, with gate 44 closed, leaving one end of the leader in position to receive another film. The film may be rewound and leader inserted in one of two ways. A reel of leader may be placed on shaft 33 and an empty reel on shaft 34 and the motor run in reverse. Alternatively, an empty reel for the film may be placed on shaft 33 and the leader reel on shaft 34, and the motor, run in the forward direction. In that case the leader reel is moved to shaft 33 after rewinding, and the lower end of the leader started around it to leave the machine ready for another film.

If a short length of film is to be processed, for example, a length equivalent to that held by two banks of rollers, the film is run onto the two left-hand banks, the remaining banks being occupied by the leader, and enough solution is used to fill only the section of the tank between the left wall and the left baffle. If four banks of rollers are to be occupied by film, enough solution is used to overflow the first baffle and fill the next section of the tank. Thus, only an amount of solution corresponding to the amount of film being developed is needed when the machine is not used to full capacity.

In case of film breakage during the developing operation, the rods 153 drop onto the film on the top rollers and the drive motor is immediately stopped, as previously described. The operator drains the tank and washes the film thoroughly by means of the water spray system to terminate any chemical reaction which may be taking place. He can then, using a dark room light, open the front panel and repair the break. The film loops are held firmly in the meantime so that sections of film cannot touch each other and damage the emulsion.

In addition to the basic parts previously described, the machine is provided with other devices which facilitate performance of various processes and operation under various conditions. For example, there are certain types of reversal color processes by which a positive image is developed on the original film. Such films require a second exposure at a certain stage in the development process. For this purpose a pair of re-exposure lamps 200, 201 are mounted, as shown in FIGS. 4 and 6, one on either side of the last rows of film, so that the film can be re-exposed from the front or back, or both, as best suited to the particular type of film. To remove moisture, which might interfere with the re-exposure, an "air squeegee," consisting of a pair of pipes 202, 203 with narrow orifices through which a stream of compressed air is discharged, is mounted to act on both sides of the film just before the film reaches the lamps. Compressed air is supplied from any convenient source through pipe 203. The film is run in the reverse direction, in the arrangement shown, until the entire film has been re-exposed for a sufficient time. In order to speed up the reexposure step, it may be desirable, especially in larger machines, to provide a similar set of lamps and air squeegees for each bank of rollers.

For most types of processing, the solution which normally clings to the film as it moves out of the bath at the bottom is sufficient to prevent aerial fogging of the picture during the developing process. For certain processes, however, it may be desirable to insure that the film is more nearly continually coated with solution during the reciprocating cycle. An arrangement for doing this, without the use of large quantities of solution, is illustrated in FIGS. 4, 6 and 20. A number of tubes 204, one to each bottom section of the tank, are mounted in the bottom of the tank. The tubes are cut off on a shallow slope, as seen in FIG. 6, so that they can draw liquid from the tank even though it is tilted in either direction. Each tube is connected through a pump 205 which pumps fluid drawn into the tube up through a pipe 206 to a number of perforated discharge pipes 207, one of which is mounted above each of the upper rollers. The pumps are regulated to deliver just enough pressure to deliver a low pressure stream from pipes 207. This stream, flowing down the film, insures complete coverage of the film during the chemical processing. Only a small excess amount of solution is needed for circulation in this manner. Circulation of the solution by this system may be useful for the purpose of speeding up the chemical reaction. Furthermore, the circulation system makes it possible to use the machine on a moving vehicle, such as a boat or airplane, where the machine cannot be kept level.

In a tank having baffles creating four compartments for the solution, as here illustrated, a separate solution circulation system is used for each compartment. Each system consists of a tube 204, an electrically driven pump 205, a pipe 206, and a pair of discharge pipes 207, one for each bank of rollers in the section. Each pump is provided with a separate circuit and switch so that one, two, three or four systems can be used, according to the number of sections in use.

In previous machines the film is immersed in the processing bath all, or substantially all of the time, and the relative movement between the film and the bath is entirely dependent on the speed at which the film is run. In the machine here described the film travels through the bath for only a short period. In emerging from the bath, the film travels upward for a longer period, carrying a coating of solution with it. This solution runs down the film under gravity so that the relative speed between the film and solution is greater than that of the film. A scrubbing action is thus produced, which rapidly carries away the products of reaction. The entire strip is subjected to this action, over a relatively long part of its travel, at the same speed and an equal number of times in both directions on each cycle of the reciprocating movement. A high rate of chemical activity is thus maintained with no danger of directional effects. This high activity, combined with the use of fresh solution for each batch of film produces a developed picture of superior quality.

This machine has many advantages over previous machines. The single tank used in this machine requires much less space and is considerably less expensive than the series of tanks needed in a continuous machine and at the same time is of much greater all around utility, because any conceivable sequence of developing steps may be performed without changing the machine. In contrast, a continuous machine is ordinarily limited to performing one particular process. Any change in the sequence or timing of the processing steps would involve such extensive alterations in the physical construction of the machine, that conversion of a continuous type of machine to perform a different process is usually not feasible. Even if the arrangement of the tanks happens to be suitable for more than one process, it is not practical to clean the tanks thoroughly enough to permit changing from one type of bath to another.

The amount of solution required for operation of this machine is so small that it is economically feasible to discard the solution after one use. The use of fresh solution for each batch of film insures high quality and consistent results, whereas in a continuous machine there is constant mixing of spent solution with the new solution which is added from time to time to maintain the proper level. The problems of carry-over and contamination are entirely eliminated, because the tank and film are thoroughly washed between process steps. Corrosion of the parts is also eliminated as the machine is left clean and dry at the end of the developing operation. The machine may also be transported readily in dry condition.

The machine may be economically used for small batch, intermittent operations, for which the continuous type of machine is unsuitable because of the large amounts of chemicals required to fill the tanks and the deterioration which occurs when such a machine is left idle.

The danger of film spoilage is minimized, as chemical reactions can be stopped by washing the film immediately if a break occurs. This feature is of vital importance when processing irreplaceable material, such as pictures taken of new events, which could not be re-photographed. In a continuous machine, if the film breaks, large sections of the film which remain in the chemical baths while the operator finds and repairs the break are usually spoiled.

The developing process in the new machine here described is as fast as, or faster than in a continuous machine, and much faster than in a rewind machine. As previously noted, the developing time required in a rewind machine is in the neighborhood of ten times that in a continuous machine. The new machine is thus capable of processing color film, movie film with sound track, and other types of film which a rewind machine cannot handle.

The selective unidirectional and reciprocating drive makes it possible to perform processing steps such as re-exposure of color and reversal film and development of sound tracks, without removing the film from the developing tank.

The tank is closed during the entire developing process, so that there is practically no movement of air around the film. This is believed to account for the fact that no aerial fogging has been found on film developed by this process, even though film is out of the solution during the major part of its travel.

When the machine has completed its cycle, the interior is clean and dry. No corrosion can occur during idle periods, and the machine is ready to use at any time, for any process.

The machine may be used for developing sensitized paper, tape, and similar materials and it is understood that the term "film" as used herein is intended to include such materials.

It is understood that variations may be made in the machine and process here described, within the scope of the appended claims.

What is claimed is:

1. A machine for processing photographic film, comprising:
   a tank providing an enclosed volume for receiving processing solution at its bottom, and having a closable opening for receiving film,
   a holder mounted in said tank, said holder including a plurality of upper rollers having spaced axes and a plurality of lower rollers having spaced axes and disposed inside said tank at the bottom thereof where said solution is received, said holder being thereby arranged for receiving through said opening in said tank an elongated continuous strip of film and for supporting a plurality of portions of the film adjacent the bottom of said tank so as to be simultaneously submerged in the processing solution, said submerged portion of the film being spaced longitudinally along the film, the lengths of the film between said submerged portions being disposed vertically above the solution and being longer than the submerged portions, and drive mechanism for alternately advancing the film in opposite longitudinal directions, each said advance being of the order of a said length so that the entire film is passed through the solution in each advance.

2. The machine of claim 1 wherein said tank includes a door in said opening movable between open and closed positions, said machine further including a supply reel spindle and a take-up reel spindle outside said enclosure opposite said door.

3. The machine of claim 1 wherein there are a plurality of processing solution compartments at the bottom of said tank, said bottom rollers are disposed with horizontal axes of rotation located below the upper edges of the walls of said compartments, and said top rollers are disposed above said compartments.

4. The machine of claim 1 wherein said holder further includes a movable roller in position to engage said strip of film when in said tank to automatically tension it against said top and bottom rollers when it is threaded spirally therearound.

References Cited

UNITED STATES PATENTS

| | | | |
|---|---|---|---|
| 634,631 | 10/1899 | Smithers | 95—94 |
| 1,158,615 | 11/1915 | Wright | 95—94 |
| 1,188,824 | 6/1916 | Ploss | 95—94 |
| 1,478,385 | 12/1923 | Dyes | 95—89 |
| 1,860,059 | 5/1932 | Smith | 95—94 |
| 2,182,886 | 12/1939 | Tondneau | 95—94 |
| 2,342,000 | 2/1944 | Leshing | 95—94 |
| 2,342,780 | 2/1944 | Zollinger | 95—94 |
| 2,595,545 | 5/1952 | Rose | 95—90.5 |
| 2,780,974 | 2/1957 | Fairbank. | |
| 2,786,736 | 3/1957 | Roughsedge | 95—94 X |
| 2,961,938 | 11/1960 | Townley | 95—89 |
| 2,989,911 | 6/1961 | Winnek | 95—89 |

OTHER REFERENCES

Book Instruction in Photography, by Abner, 11th edition, 1905, p. 393.

JOHN H. HORAN, *Primary Examiner.*

UNITED STATES PATENT OFFICE
CERTIFICATE OF CORRECTION

Patent No. 3,382,790

May 14, 1968

Ralph G. Matheson

It is certified that error appears in the above identified patent and that said Letters Patent are hereby corrected as shown below:

Column 1, line 36, "processin gis" should read -- processing is --. Column 3, lines 63 and 64, cancel "FIG. 8 is a cross-section taken along line 8-8 of FIG. 7;". Column 7, line 46, "on the friction" should read -- of the friction --. Column 8, line 16 and column 9, lines 10 and 12, "22", each occurrence, should read -- 21 --; same column 8, line 23, "any type" should read -- any suitable type --; line 69, "belowe" should read -- below --; same column 9, line 21, "films" should read -- film --; line 54, "developments" should read -- development --. Column 10, line 67, "reexposure" should read -- re-exposure --. Column 11, line 37, "In" should read -- On --. Column 12, line 71, "portion" should read -- portions --.

Signed and sealed this 10th day of March 1970.

(SEAL)
Attest:

Edward M. Fletcher, Jr.
Attesting Officer

WILLIAM E. SCHUYLER, JR.
Commissioner of Patents